March 27, 1951     D. V. WADSWORTH ET AL     2,546,178
RETARDING YEAST GROWTH IN SUGAR SIRUPS
Filed March 13, 1948
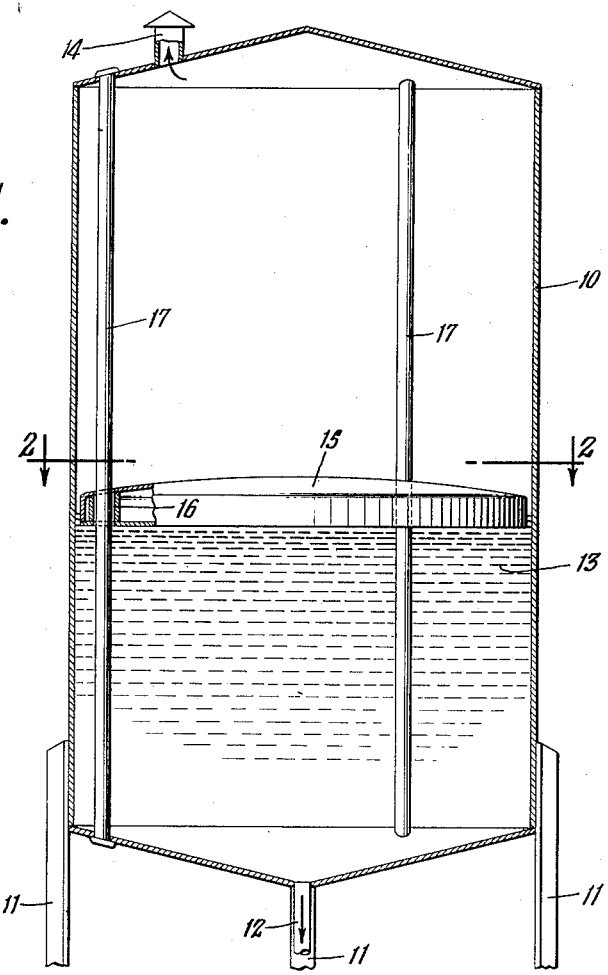
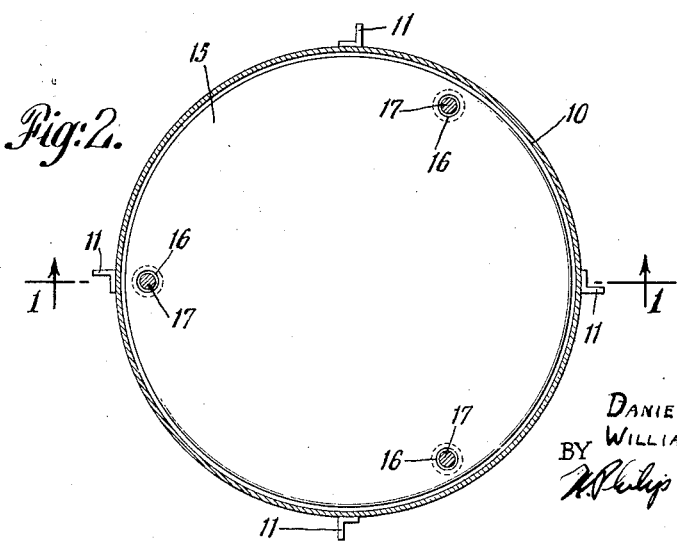
INVENTORS
DANIEL V. WADSWORTH
WILLIAM L. OWEN
BY
ATTORNEY

Patented Mar. 27, 1951

2,546,178

UNITED STATES PATENT OFFICE 2,546,178

RETARDING YEAST GROWTH IN SUGAR SIRUPS

Daniel V. Wadsworth, Plandome, N. Y., and William L. Owen, Baton Rouge, La., assignors to Refined Syrups & Sugars, Inc., Yonkers, N. Y., a corporation of New York Application March 13, 1948, Serial No. 14,784

14 Claims. (Cl. 99—165)

This invention relates to the retarding of yeast and mold growth in sugar syrups, and is particularly applicable to such syrups while they are being stored or shipped.

It is well known that sucrose syrups, dextrose syrups, edible molasses and the like undergo certain fermentative changes induced by various species of yeast. The nature of and tendency for such changes to take place is affected by the density of the syrups as well as by their chemical composition. It is also known that under certain conditions, the effect of these yeasts becomes less and may even cease when the density of the solution reaches sufficiently high levels. However, this limiting effect of density upon yeast growth varies with the composition of the syrup. For example, a syrup consisting of dextrose, maltose and dextrins made from hydrolyzed starch will sustain yeast growth at a higher density than a syrup which is composed entirely of sucrose and invert sugar.

In syrups which contain substantial amounts of fermentable sugars such as the hexoses, the yeast growth is more or less uniform throughout the entire body of solution. One possible explanation of this fact is that the lack of oxygen necessary for the growth of these microorganisms is not important because the fermentable sugars, if present in adequate concentration, serve as a source of energy for their respiration.

We have found that in the case of sugar syrups, and particularly sucrose syrups, which contain no more than a minor portion of fermentable sugars, a different action takes place. In these syrups, the yeasts which are troublesome are compelled to rise to the surface of the liquid in order to obtain sufficient oxygen to support their growth. As the yeast growth continues at the surface of the syrups, the growth or movement of the yeasts is downward, tending to permeate the entire body of syrup. Meantime, these yeasts induce fermentation of the syrup.

The yeasts which are troublesome may be described as osmophiles, that is a group of yeasts that are capable of growing, multiplying and destroying or modifying sugars even in high concentration syrups, either by causing fermentation of the sugars or by inversion of sucrose.

Accordingly, one object of this invention is to retard the growth of yeasts in such syrups during the storing or shipping thereof by preventing the ready access of air or oxygen to the surface of the syrup.

A further object of the invention is the retarding of yeast growth during the storing or shipping of such syrups by covering the surface of the syrup with a layer of solid, liquid or gaseous material to prevent contact of the liquid surface with the air, the material for such layer preferably being one that does not react with, dissolve in, impart odor, taste or otherwise deleteriously affect the syrup being protected.

Tests of columns of sucrose syrups inoculated at different levels with yeasts have shown that regardless of the point of inoculation, the yeasts soon colonize at the syrup surface and attain concentration at the surface of the syrup exceeding their concentration at any other point in the liquid. In this manner, they obtain oxygen not otherwise obtainable and are enabled to multiply rapidly. Hence, by covering the surface of the syrup with a layer of solid, liquid or gaseous material which protects the syrup and prevents free access of air to its surface, the growth of yeasts in such a body of syrup is greatly retarded, and in some cases may even be entirely arrested.

Fig. 1 of the drawings is a vertical sectional view taken on the line 1—1 of Fig. 2, showing one form of storage apparatus embodying our invention.

Fig. 2 is a horizontal sectional view of the apparatus taken on the line 2—2 of Fig. 1.

One form of apparatus for retarding yeast growth by means of a float covering the liquid surface is illustrated in the drawings. Numeral 10 indicates a suitable storage tank supported on legs 11 and provided at its bottom with a conduit 12 through which the syrup 13 may be pumped into or out of the tank. An air vent 14 may be provided at the top of the tank.

Inside the tank 10, a float 15 is provided which has three openings 16 so that it can slide up or down on the three fixed rods 17 in the interior of the tank. The float shown is made of metal and is hollow so that it rests on the surface of the syrup 13 and floats up or down as the level of liquid is raised or lowered. Such a float may, of course, be made of wood, various plastics, metal or other material, but is preferably made of a material that is not easily wetted by the syrup, and of a design such that the syrup does not flow up around its edges onto the top of the float. The solid material of which the float is constructed may be of a specific gravity which naturally floats on the surface of the syrup, made hollow or with compartments so that it floats naturally, or it may be countedweighted if necessary.

Tests of the use of such a float have indicated that at the end of a storage period of one week, syrups in tanks fitted with floats contain a considerably smaller number of yeast cells per cc. than when the surface of the syrup was exposed.

The results of one such test are indicated in the following table, the yeast counts in each case being made on a sample of syrup taken from the surface of the liquid in the tank. These tests were made with a concentrated syrup of refined sucrose containing not more than a fraction of 1% of invert sugar.

*Table I*

| Series | Height of fill | Surface covering | Period of storage | Number of yeast cells per cc. |
|---|---|---|---|---|
| A | 1″ from Top | None | 1 Week | 192,000 |
| B | Half Filled | do | do | 500,000 |
| C | 1″ from Top | Float | do | 1,500 |
| D | Half Filled | do | do | 241 |

It is apparent from the foregoing results that less yeast growth is obtained when the tank is completely or nearly filled than when it is only half filled. However, this difference is far less striking than the difference between the tests with syrup having its surface covered with a float and with syrup stored with its surface exposed to the air.

Various liquids may also be used to protect the surface of such a sugar syrup, although preferably the liquid used should be completely or nearly completely immiscible with the sugar syrup, unreactive chemically therewith and should not impart any objectionable odor, taste or color to the syrup. Vegetable oils may be used, but have a tendency to become rancid and therefore are not as desirable as mineral oils.

The ideal liquid material for protection of the surface of the syrup is a liquid which is either immiscible or has a very low miscibility with the sugar syrup, is non-inflammable, imparts no objectionable odor, taste or color to the syrup, and is completely unreactive with it. Such a liquid should also have a lower specific gravity than that of the sugar syrup so that it will readily float on the surface. It is very difficult, however, to find a liquid which meets all of these conditions and is still relatively inexpensive, so that as a practical matter it may be necessary to sacrifice some of these desirable properties. Refined mineral oil is satisfactory, and although it is inflammable, it qualifies in other respects as a suitable medium for preventing access of oxygen to the surface of the syrup.

These sugar syrups may also be protected by means of a non-oxidizing gas, preferably one which is relatively insoluble and unreactive with the syrup at ordinary temperatures and pressures. Also, it is desirable, of course, to employ a gas which has a sufficiently high specific gravity so that it tends to settle and form a definite blanket on the surface of the syrup. Carbon dioxide is one example of a gas that is satisfactory, and a concentrated syrup of refined sucrose was divided into four portions and stored for thirty days with carbon dioxide applied to its surface, the gas being injected at different points as indicated in the following table:

[Period of storage 30 days.]

| Series | Point at which $CO_2$ applied | Inoculation temperature | Number of yeast cells per cc. after 30 days |
|---|---|---|---|
| A | ⅛″ below surface | 34 | 100 |
| B | ⅛″ above surface | 34 | 24,000 |
| C | 2″ above surface | 34 | 5,000 |
| D | Control | 34 | 70,000 |

The yeast counts at the start of this storage period were 2 per cc. and the results in the table indicate convincingly the retarding effect of the gas layer on the growth of yeasts. Here again, the yeast counts in each case were made on a sample of the syrup taken from the surface of liquid.

The sugar syrups to which our invention is particularly applicable are the syrups of relatively high density such as those containing at least about 60% solids. Such syrups, of course, should not have too high a content of invert or fermentable sugars or the surface protection will not be effective to retard yeast growth. In general, the treatment of our invention is effective with syrups containing less than 10%, and preferably less than 5%, of fermentable sugars. The process of our invention is particularly effective with syrup of refined sucrose containing less than 1% of invert or fermentable sugars. In fact, for best results, the syrup should have as high a solids content as practical if the amount of invert sugars exceeds 1%.

By thus retarding the growth of yeasts in sugar syrups not only is the growth of yeasts which destroy or modify the sugar retarded but also the growth of molds is suppressed, thus eliminating their inverting action on sucrose which would otherwise provide invert sugar on which the yeasts might thrive. Thus, the ultimate effect of our invention is to reduce both the fermentation and the inversion of the sugars in these syrups.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

It is claimed:

1. A process of retarding growth of molds and yeasts in a syrup containing no more than a minor proportion of fermentable sugars which comprises maintaining a layer of material in contact with the surface of said syrup to prevent access of air thereto.

2. A process of retarding growth of molds and yeasts in a syrup consisting principally of sucrose which comprises maintaining on the surface of said syrup a layer of liquid which is substantially unreactive and immiscible therewith.

3. A process of retarding growth of molds and yeasts in a syrup containing no more than a minor proportion of fermentable sugars which comprises maintaining on the surface of said syrup a layer of oil to prevent access of oxygen thereto.

4. A process of retarding growth of molds and yeasts in a syrup containing no more than a minor proportion of fermentable sugars which comprises floating on the surface of said syrup a layer of solid material to prevent access of oxygen to said surface.

5. A process of retarding yeast growth in a sugar syrup which comprises storing said syrup in a receptacle, and maintaining in contact with the surface thereof at various levels of syrup a float of a size and shape that substantially prevents access of air to said surface.

6. A process of retarding growth of molds and yeasts in a syrup containing no more than a minor proportion of fermentable sugars which comprises storing said syrup in bulk, and floating on the surface of said syrup a layer of solid material to prevent ready access of air to said surface.

7. A process of retarding growth of molds and yeasts in a syrup containing no more than a minor proportion of fermentable sugars which comprises applying to and maintaining on the surface of such syrup a layer of a non-oxidizing gas to prevent access of oxygen to said surface.

8. A process of retarding growth of molds and yeasts in a syrup containing no more than a minor proportion of fermentable sugars which comprises applying to and maintaining on the surface of such syrup a layer of carbon dioxide gas.

9. A process of storing and shipping bulk sucrose syrup to retard the growth of yeasts and molds therein which comprises placing such syrup in concentrated form in a receptacle, and maintaining on the surface thereof a layer of material that is substantially unreactive and immiscible with said syrup and that prevents ready access of air and oxygen to said surface.

10. A process of storing and shipping bulk sucrose syrup to retard the growth of yeasts and molds therein which comprises placing such syrup in concentrated form in a receptacle, and maintaining on the surface thereof a layer of oil that is substantially unreactive and immiscible with said syrup.

11. A process of storing and shipping bulk sucrose syrup to retard the growth of yeasts and molds therein which comprises placing such syrup concentrated to a density of at least about 60% solids in a receptacle, and preventing access of air to the surface of said syrup by maintaining thereon a layer of mineral oil.

12. A process of storing and shipping bulk sucrose syrup to retard the growth of yeasts and molds therein which comprises placing such syrup concentrated to a density of at least about 60% solids in a receptacle, and preventing access of air to the surface of said syrup by maintaining in constant contact therewith a float of solid material.

13. A process of storing and shipping bulk sucrose syrup to retard the growth of yeasts and molds therein which comprises placing such syrup concentrated to a density of at least about 60% solids in a receptacle, and preventing access of air to the surface of said syrup by maintaining thereon a layer of non-oxidizing gas.

14. A process of storing and shipping bulk sucrose syrup to retard the growth of yeasts and molds therein which comprises placing such a syrup containing no more than a minor proportion of fermentable sugars and concentrated to a density of at least about 60% solids in a receptacle, and preventing access of oxygen to the surface of said syrup by maintaining in constant contact therewith a layer of material that is substantially unreactive and immiscible with the syrup.

DANIEL V. WADSWORTH.
WILLIAM L. OWEN.

REFERENCES CITED

The following references are of record in the file of this patent:

UNITED STATES PATENTS

| Number | Name | Date |
| --- | --- | --- |
| Re. 21,135 | Bailey | July 4, 1939 |
| 625,280 | Walker | May 16, 1899 |
| 1,114,748 | Graeber | Oct. 27, 1914 |
| 1,231,585 | Fleischer | July 3, 1917 |
| 2,052,270 | Zoelly | Aug. 25, 1936 |
| 2,388,163 | Laird | Oct. 30, 1945 |

FOREIGN PATENTS

| Number | Country | Date |
| --- | --- | --- |
| 369,391 | Great Britain | Mar. 24, 1932 |